United States Patent
McCartney, Jr. et al.

[11] 3,891,459
[45] June 24, 1975

[54] NEGATIVE LEAD-ACID BATTERY PLATES WITH EXPANDED LEAD SHEET GRIDS

[75] Inventors: Charles P. McCartney, Jr., Yorktown; Norman L. Willmann, Anderson, both of Ind.

[73] Assignee: General Motors Corporation, Detroit, Mich.

[22] Filed: Sept. 20, 1973

[21] Appl. No.: 399,109

[52] U.S. Cl. .................................. 136/26; 136/36
[51] Int. Cl. .......................................... H01m 35/04
[58] Field of Search .............................. 136/36–41, 136/48–49, 50–52, 64, 35, 66–67, 26–27, 9; 29/6.1, 6.2, 193.5; 52/670, 672, 635; 72/187, 198, 366, 392, 203

[56] References Cited
UNITED STATES PATENTS

| | | | |
|---|---|---|---|
| 2,275,194 | 3/1942 | Sizelove | 136/36 X |
| 2,909,586 | 10/1959 | Hagspihl | 136/36 |
| 3,099,899 | 8/1963 | Horn et al. | 136/57 X |
| 3,310,438 | 3/1967 | Huffman et al. | 136/38 X |
| 3,607,411 | 9/1971 | Brownrigg | 136/37 |
| 3,702,265 | 11/1972 | Snyder et al. | 136/26 |

*Primary Examiner*—Anthony Skapars
*Attorney, Agent, or Firm*—Lawrence B. Plant

[57] ABSTRACT

A negative Faure-type lead-acid storage battery plate including a grid expanded from a lead sheet and having a current-collecting header of unexpanded sheet and a reticulated portion expanded, guillotine style, from the sheet into rows having a plurality of paste-retaining cells bounded by skeletal elements and nodes formed during expansion. A greater number of skeletal elements and nodes are provided contiguous the header than throughout the remainder of the reticulated portion resulting in smaller cells in the row(s) nearest the header. The skeletal elements and nodes extend in opposite directions through the paste from substantially one face of the plate to the other yet still provide paste continuity from one cell to the next. The nodes are twisted and partially flattened as described in copending U.S. patent application Ser. No. 398,975 filed Sept. 20, 1973.

2 Claims, 9 Drawing Figures

PATENTED JUN 24 1975　　　SHEET　1　　　3,891,459

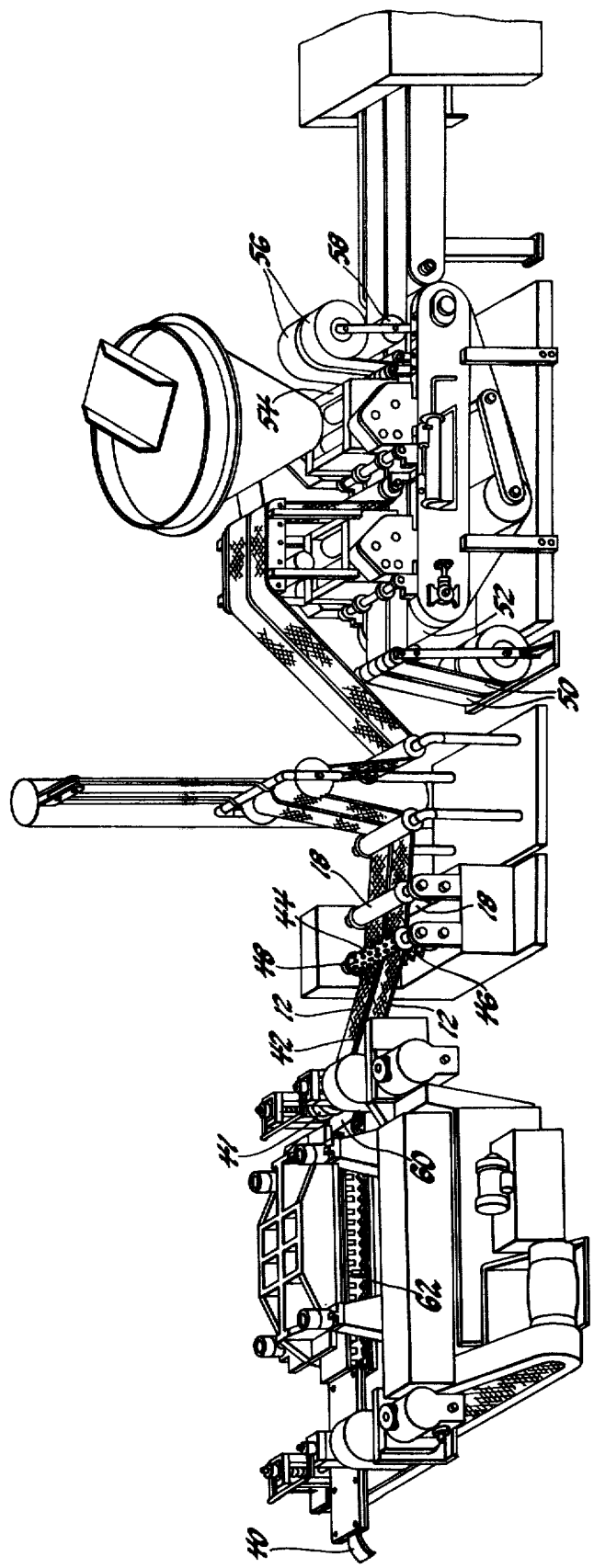

NEGATIVE LEAD-ACID BATTERY PLATES WITH EXPANDED LEAD SHEET GRIDS

This invention is an improvement to the negative lead-acid storage battery plates disclosed in copending U.S. patent application Ser. No. 398,975, filed Sept. 20, 1973 in the names of Wheadon et al and assigned to the assignee of the present invention. That application, which is herein incorporated by reference and hereinafter referred to as the Wheadon et al. plate, relates to a Faure-type (i.e., pasted) lead-acid storage battery plate having a conventional leady active material paste embedding a grid expanded from a sheet of lead by the guillotine method. As in that application, the term "leady" active materials is herein meant the lead, lead oxide and lead sulfate forms conventionally found in lead-acid batteries, but more particularly, here the term is restricted to negative active materials which, as pasted, are principally oxides and as formed, principally lead. Similarly, the term "lead" sheet is intended to include not only pure lead but also those typical lead alloys found in conventional lead-acid battery grids, especially the non-antimonial lead alloys and particularly the lead-calcium alloys. More specifically, the aforesaid Wheadon et al. plate is composed of a paste-supporting skeleton of expanded sheet lead having an unexpanded, current-collecting top header portion and an expanded reticulated portion depending from the header. The reticulated portion includes a plurality of thin wire-like skeletal elements emanating from nodes which interconnect the several skeletal elements and are substantially thicker than the skeletal elements. Each node angles through the paste at an angle nearly normal to the plane of the plate and has a thickness which is greater than the thickness of the original sheet lead from which it was derived, is substantially less than twice the thickness of that sheet lead, and has flat surfaces or plateaus laying in the principal planes of this grid. After expansion, the Wheadon et al. grid is conditioned so as to angularly orient the node by rotating it slightly and concurrently flatten those salient edges of the node which, by virtue of the node rotation, would otherwise project from the opposed faces of the grid. The flattening of the salient edges of the nodes changes the substantially rectangular vertically transverse cross-section of the as-expanded node to a polygonal cross-section having two opposed, substantially parallel sides which lay in the principal planes (i.e., the faces) of the grid, and are spaced apart one from the other by a distance greater than the thickness of the header sheet but less than twice that thickness. The skeletal elements diverge from each node so as to angle from one face of the grid to the other, but in opposite directions to the nodes from which they emanate so as to provide support for the subsequently applied paste over substantially the entire thickness of the pasted plate. The opposite angling of the nodes and skeletal elements insures continuity of the paste between adjacent, paste-retaining, polygonal cells. Such grids are most economically useful with negative plates when the metal content thereof is close to the minimum needed for plate strength. This is best accomplished with a very open reticulated portion made by forming large (i.e., at least about 0.5 in.$^2$) paste-retaining cells and utilizing fibers in the paste to help hold it together. However, such very open grids tend to fail in use due to separation of the header from the reticulated portion apparently due to the extra load the upper skeletal elements and nodes must bear.

It is therefore an object of the present invention to provide an improved Faure-type negative lead-acid storage battery plate in which very open expanded and conditioned sheet lead defines a paste-supporting grid which grid is reinforced with additional nodes and elements near the top thereof and contiguous the header.

This and other objects and advantages will be more readily apparent from the detailed description which follows in which:

FIG. 9 is a perspective view illustrating apparatus for continuously making grids of the type involving the present invention.

Figure 1:
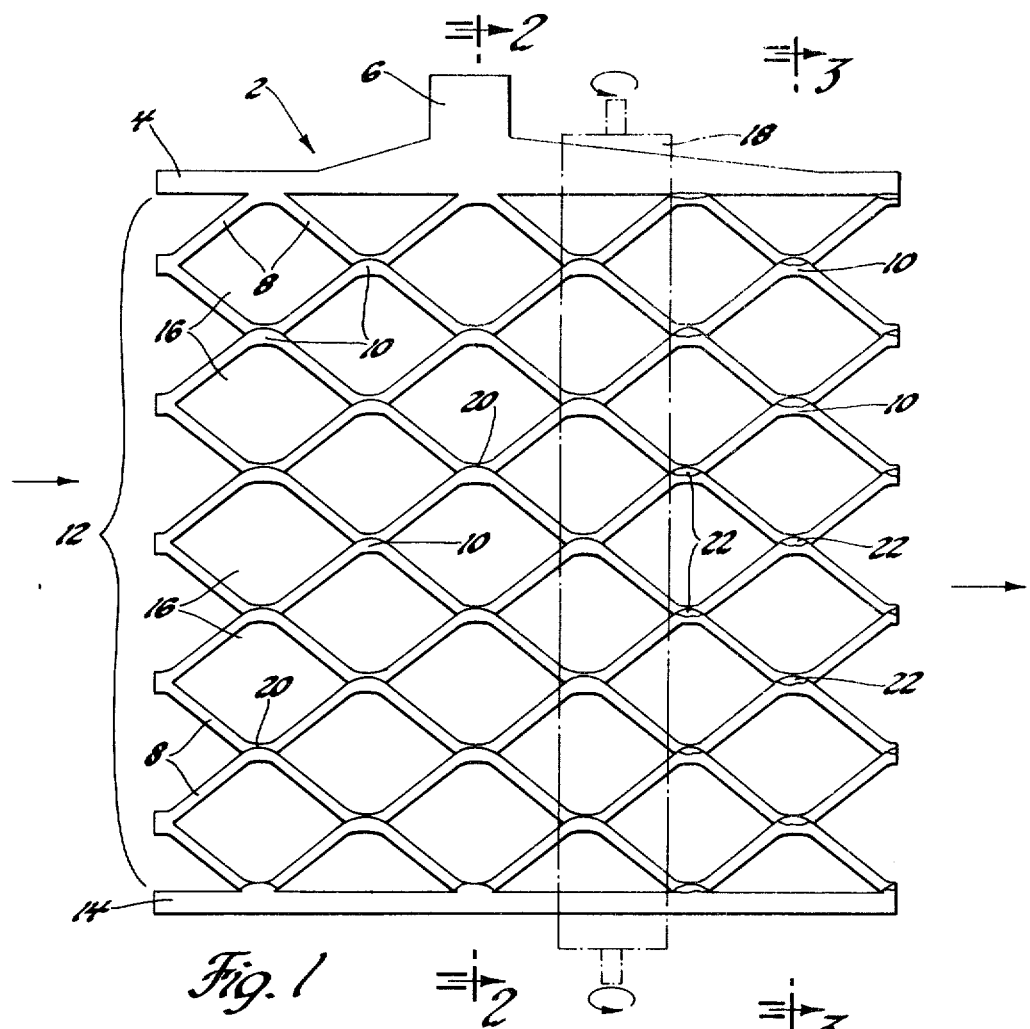
FIG. 1 is a front elevational view of a Wheadon et al. expanded lead sheet grid.

This invention comprehends a top-reinforced, negative, Wheadon et al., Faure-type lead-acid storage battery plate having a grid expanded from lead sheet by the guillotine method so as to have a current-collecting header 4 and lugs 6 of unexpanded sheet and a reticulated paste-supporting portion 12 expanded from the sheet into a plurality of polygonal paste-retaining cells 16 depending from the header. More specifically, this invention provides more but smaller paste-retaining cells 16' (FIG. 6) contiguous the header 4 than there are throughout the major and lower part of the reticulated portion 12. The paste-retaining cells are defined by wire-like skeletal elements 8 connected one to the other by oriented, cross-sectionally (i.e., vertically transverse) polygonal nodes 10, each node having at least two substantially parallel flat plateaus 22 laying in the principal faces of the grids. The plateaus 22 are spaced from each other by a distance at least about 1.3 times the thickness of the lead sheet from which the reticulated portion 12 was expanded and the header 4 formed. Both the skeletal elements 8 and nodes 10 extend diagonally through the thickness of the plate, but in respectively opposite directions as in Z-fashion, thereby providing continuity between the paste from one cell to the next and enhancing paste retention to the grid.

The nodes thus described are formed by expanding lead sheet according to the guillotine method of expansion such as disclosed in Curtis U.S. Pat. No. 1,482,600, whereby a plurality of skeletal element tiers are formed which extend substantially perpendicular to the lead sheet from which they are punched. The several tiers are connected to the next adjacent tiers via nodes 10 which comprise unslit and unstretched portions of the sheet intermediate the skeletal elements of each tier, the said nodes being about twice the width of the skeletal elements joining to form the node. Lead sheets useful with this technique vary in thickness from about 0.035 to about 0.05 inch. The thinner sheets are used primarily in negative plates and the thicker sheets in positive plates. The width of the skeletal elements can also vary considerably. For very open reticulated portions (i.e., 1.4 cells/in.$^2$) on negative grids, at least about 0.025 inch widths and skeletal element cross-sectional areas of at least about 0.0012 sq. in. are considered necessary. These yield about the minimum amount of grid metal needed for plate strength. It is for grids such as these, where the greater number of skeletal elements and nodes near the header are necessary.

As with the Wheadon et al. grid, the modified reticulated portion of this invention is gradually laid down into substantially the same plane as the lead sheet from which it was punched, with the nodes 10 laying at a slight angle (i.e., about 2° – 4°) to that plane. This is followed by uniformly stretching each tier in a direction directly away from the header, which stretching action slightly rotates the nodes 10 and makes the paste-retaining cell more equiaxed by elongating the minor axis of the cell (i.e., perpendicular to the header) and shortening the major axis of the cell (i.e., parallel to the header). For very open negative plates having large cell areas in proportion to grid metal, a minor to major axis ratio of at least about 0.7 is preferred. As a result of this stretching, the total reticulated portion is extended by an amount equal to the summation of the increase in length of the minor axes of the cells in each of the several tiers making up the grid.

Following stretching, the reticulated portion 12 is next passed through a set of rollers 18 in the direction of the major axis or, in other words, in a direction 90° to the direction of expansion. This, in combination with carefully controlled spacing between rollers, causes still further rotation of the nodes to between about 6° and 15° and concurrently flattens into plateaus the outwardly projecting or salient edges of the nodes which had rotated to the outward faces of the grid. As a result, the otherwise substantially rectangular cross-section of the as-expanded node 10 is changed to a polygonal cross-section (see FIG. 5) in which the flattened portions or plateaus 22 of the nodes 10 lay in the principal faces of the grid and are spaced from each other by a distance at least about 1.3 times, but substantially less than two times, the thickness of the header sheet 4. By this twisting and flattening, each node is significantly mechanically worked causing some flow and bulging of the node, but in a manner which is not so severe or harsh as to significantly damage the reticulated portion and shorten the useful life of plates made therefrom.

Economical commercial acceptability and in-use life and reliability of very open negative grids is insured by including small (i.e., ⅛ – ¼ inch) lengths of inert fiber (e.g., Dynel) in the pastes. When fibers are used, they will generally be used in concentrations of less than about 0.5% by weight and preferably about 0.25% by weight. Higher than normal density pastes (i.e., about 140 ± 5 g/2 in.$^3$ drop weight) are preferred to match grid growth to paste growth. Otherwise, the chemistry of the pastes remains the same as conventionally found in lead-acid batteries.

Figures 2, 3, 4, 5:
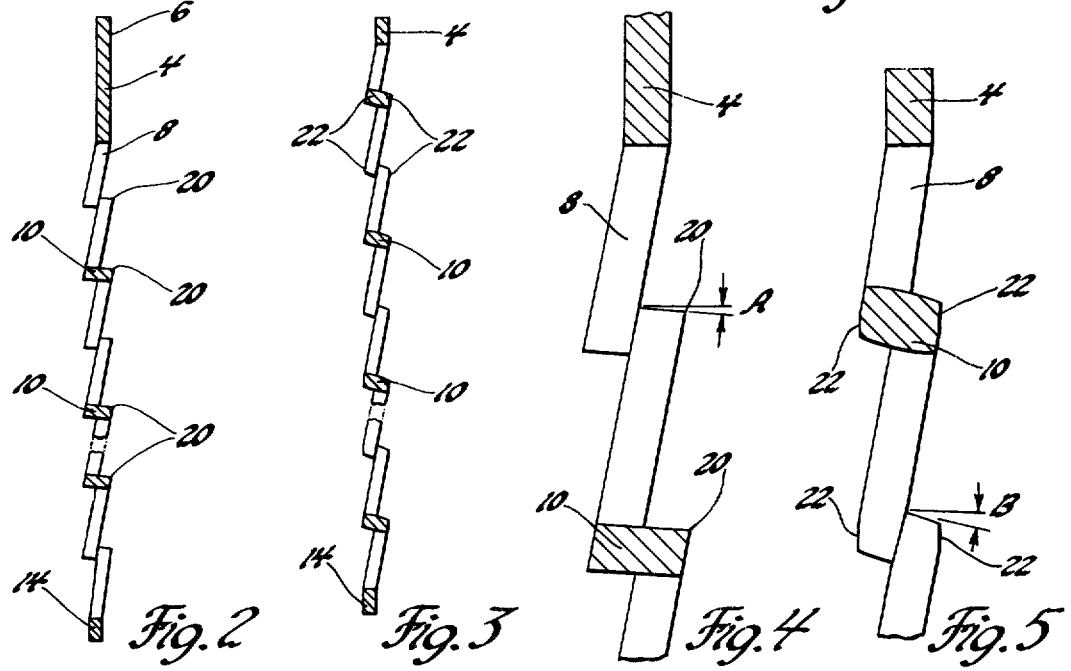
FIG. 2 is a side view in the direction 2—2 vertically transverse the grid of FIG. 1, before modification.
FIG. 3 is a side view in the direction 3—3 vertically transverse the grid of FIG. 1, after modification.
FIG. 4 is an enlargement of the uppermost portion of FIG. 2.
FIG. 5 is an enlargement of the uppermost portion of FIG. 3.
Figure 6:
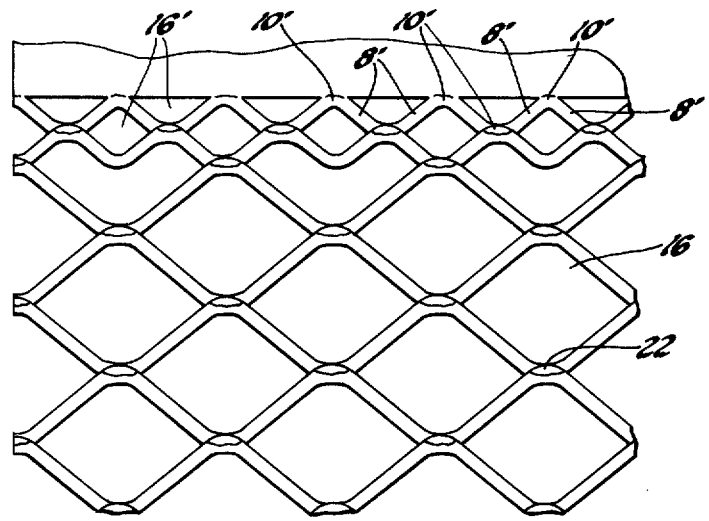
FIG. 6 is a front elevational view of the upper portion of a negative Wheadon et al. grid modified in accordance with the present invention.
Figure 7:
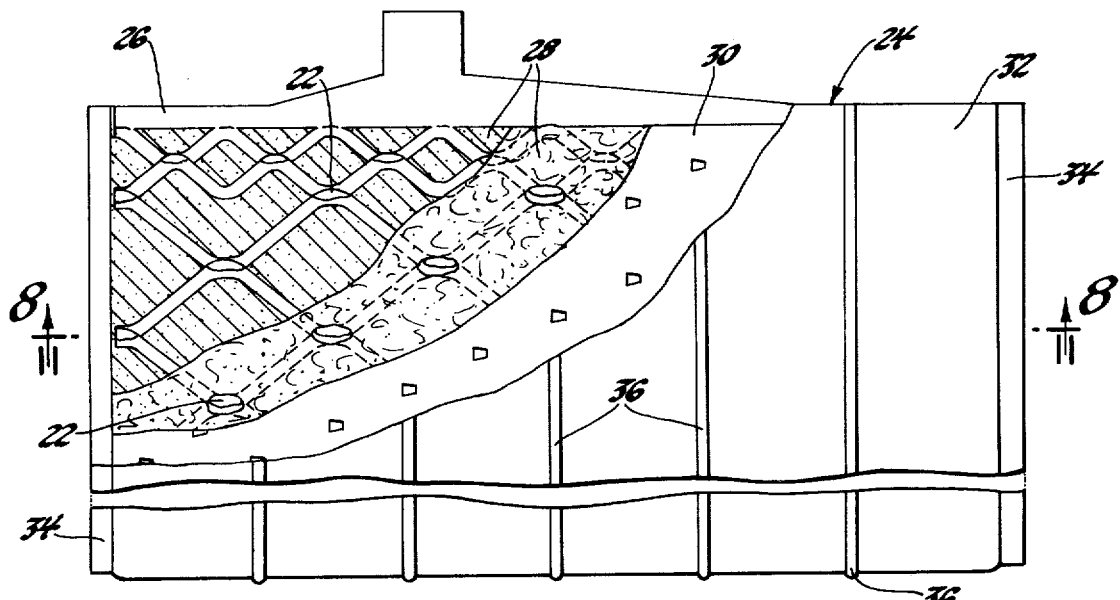
FIG. 7 is a partially broken-away front elevational view of a separator-encapsulated, paper-bound, battery plate of the present invention.
Figure 8:
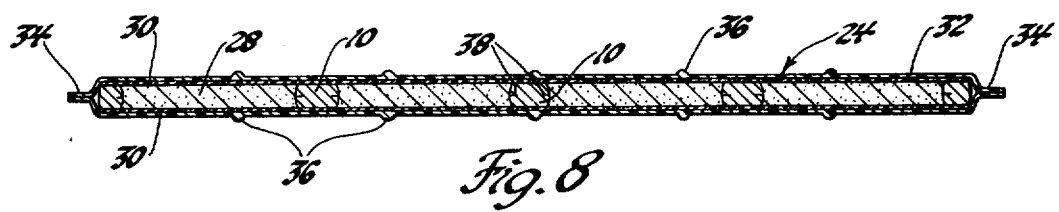
FIG. 8 is a bottom view in the direction 8—8 of FIG. 7.

With more particular reference to the drawings, FIGS. 1 – 5 show the Wheadon et al. grid and FIGS. 6 – 8 our improvement thereof. As discussed in Wheadon et al., FIG. 1 shows grid blank 2 comprising a header 4 having a lug 6. The single grid blank shown has previously been expanded, laid flat and stretched as described above. These operations are preferably carried out on continuous strips expanded in opposite directions from the longitudinal edges of the strip and the single grids then cut from the strip. A plurality of skeletal elements 8 and nodes 10 depend from the header 4 making up the reticulated portion of the grid generally indicated at 12. A bottom border 14 is provided for the very open negative grids to prevent warpage of the grid-making strips during the expansion process and to support the plate on the bridges at the bottom of the battery case. The skeletal elements 8 and the nodes 10 making up the reticulated portion 12 define a plurality of polygonal paste-retaining cells 16. The already expanded and stretched grid blank 2 is depicted as moving from left to right between compression rollers 18 (top roller shown in phantom), which mechanically work the nodes 10 rotating them about an axis parallel to the header 4 and flattening the salient upstanding edges 20 of the as-expanded grid to form plateaus 22 on the as-rolled grid. In this regard, FIGS. 2 and 4 depict the as-expanded grid blank 2 prior to rolling and shows the salient edges 20 of the nodes 10 and the slight angle A that the node 10 bears to the principal planes of the grid blank 2. FIGS. 3 and 5 depict the grid blank 2 after rolling and shows the increased angle B resulting from the rotation of the node as well as the flattening of the edges 20 into plateaus 22. Hence, what was initially a substantially cross-sectionally rectangular node 10 prior to rolling is transformed, after rolling, into a cross-sectionally polygonal node by the addition of two sides which are the parallel plateaus 22. In addition, the working of the node 10 causes it to bulge or round a bit as best shown in FIG. 5. The overall affect of the rolling then rotates the nodes, works the metal thereof and provides two opposed plateaus 22 which are separated one from the other by a distance which exceeds the thickness of the header 4 but is substantially less than twice that thickness. The distance between the plateaus formed during rolling fixes the thickness of the grid and the principal planes of the grid are those planes which include the plateaus 22. Flush pasted grids will be pasted to this thickness, i.e., between the plateaus 22 (see FIG. 7), while over pasted plates (not shown) will have the paste extending somewhat beyond the principal planes of the grid.

FIGS. 6 – 8 depict our improved negative plate. Negative plates are inherently conductive and therefore require only enough grid lead to give strength to the grid and supplement its inherent conductivity. As a result, negative grids can be made with very substantially less lead and significantly larger paste-retaining cells 16 than is required for positive plates. Plan view area-wise, this results in a low cell density of large cells such as shown in FIG. 7. A typical such negative grid might have about 1.4 cells per in.$^2$ of grid with each cell having an area of at least about 0.5 in.$^2$. With such grids the number of contact points between the reticulated portion 12 and the header 4 can be as few as four, which are too few for a good strong plate. As a result, there is a tendency for the reticulated portions 12 of such open grids to pull away from the header 4 under the weight of the paste and in-plant handling and subsequent use of the grid. The embodiment shown in FIG. 6 provides a greater concentration of skeletal elements 8' and header contact points 10' in the weak areas of the negative grid which not only improves its strength, but also reduces the IR drop of the plate. This increased number of skeletal elements and contact points results from the final set of expansion dies which produce more, but smaller, paste-retaining cells 16' in the top row contiguous the header. Otherwise the grid remains substantially the same as discussed earlier.

FIGS. 7 and 8 show a unit assembly 24 including a very open negative grid 26 in accordance with this invention. This grid 26 would have its header, lug, skeletal elements, nodes and plateaus formed in the manner discussed above and have its reticulated portion embedded in a fiber-laden (e.g., Dynel, polypropylene, etc.) paste 28. This grid 26 is flush pasted by forcing the paste into the grid between two strips of perforated paper (here shown as sheets 30) such as disclosed in U.S. Pat. No. 3,758,340 issued Sept. 11, 1973 in the name of Morris E. Adams and assigned to the assignee of the present invention. Alternatively, the grid strip is pasted with the paper strips using a more conventional belt pasting technique as is well known in the art. The paper-bound pasted strip is then cut into individual plates and, after appropriate curing, etc. as may be required, enclosed in a conventional battery separator 32 (e.g., sintered polyvinyl chloride). This is most conveniently accomplished by folding the separator around the bottom of the pasted grid 26 and heat sealing the lateral edges 34 thereof. Spacing ribs 36 on the outside of the separator 32 provide space between the assembly 24 and the negative plate to permit a more efficient circulation of the electrolyte through the cell group. FIG. 8 also depicts the small fracture 38 which usually forms and extends into the nodes 10' during the expansion process.

In a specific example of the invention, negative grids were made by expanding a 2.38 inch wide, 0.04 inch thick ribbon of lead-calcium-tin alloy (0.065% Ca, 0.7% Sn). An inverted, Curtis-like, in-line continuous expander (see FIG. 9) was used to expand the ribbon 40 upwardly from both longitudinal edges so as to produce two expanded, reticulated portions joined by a common unexpanded portion 42. Skeletal elements having a width of 0.05 inch were punched and stretched from the ribbon and were joined by nodes having a width of 0.1 inch. Nine tiers of the longer skeletal elements 8, two tiers of the shorter skeletal elements 8', and a bottom border were provided so as to yield a grid having about 32 large cells and seven small cells in the top row. After expansion the grid strip was passed beneath a pair of plows 60 which gently fold the reticulated portion down to a position more nearly in the plane of the unexpanded center portion but with a slight hump where the reticulated portion joins the unexpanded portion. This is followed by leveling out the hump by passing the strip beneath an outwardly beveled roller 41 which presses the humps downwardly and more nearly into the plane of the unexpanded portion. The strip is next passed between a pair of forming rollers 44 which stretch the reticulated portions in a direction 90° from the unexpanded portion and increased this dimension of the reticulated portions by about ¼ inch. The forming rolls included an embossed lower roll having a plurality of truncated pyramidal projections 46 for engaging each of the cells of the grid to stretch the grid uniformly. The opposing roll had a polyurethane foam outer layer with holes 48 adapted to receive the projections and press the skeletal elements and node toward the base of the projections 46 to form the cells about the projections and thereby uniformly stretch the reticulated portion. From the stretching-/forming rolls, the grid strip is passed between flattening rolls 18, discussed above, where the slightly canted nodes are rotated and their salient edges flattened into plateaus which are 0.055 inch apart. Hence, an overall node reduction from about 0.1 inch to about 0.055 inch is effected. The reticulated portions are next pasted by laying them on top of strips of perforated paper 50 (e.g., see Adams U.S. Pat. No. 3,758,346), on a continuous belt 52, passing it under a paste-dispensing apparatus 54 adapted to press the paste around the skeletal elements from one side of the grid, covering it with a second layer of paper 56 and finally rolling (see rollers 58) it to a predetermined finished thickness of about 0.065 inch.

While we have disclosed my invention in terms of a specific embodiment thereof, we do not intend to be limited thereto, but rather only to the extent set forth hereafter in the claims which follow.

We claim:

1. A negative lead-acid storage battery plate of the Faure-type comprising:

a paste-supporting skeleton of lead material defining a flat, top current-collecting header of sheet lead having a predetermined thickness and an upstanding connector lug, a reticulated portion depending from the header over substantially the entire length thereof and including a plurality of nodes from which skeletal elements project to define a plurality of polygonal paste-retaining cells there being significantly more nodes, skeletal elements and paste-retaining cells per unit area of reticulated portion contiguous to the header than in reticulated portions more remote from the header said header-contiguous cells having significantly smaller paste-retaining areas than the cells remote from the header, said nodes angling from one face of the reticulated portion to the other face thereof and having a polygonal cross-section in the vertical transverse plane with two opposing sides of each polygon in planes substantially parallel to the faces of the pasted plate and spaced one from the other by a distance greater than said predetermined thickness but substantially less than twice said predetermined thickness, and said skeletal elements angling from one side of each node to the opposite side of the adjacent node to which it connects; and a fiber-laden, leady active material paste embedding the reticulated portion of the skeleton and together therewith defining a substantially flat plate having substantially parallel faces and a thickness at least equal to the distance between said opposing sides of said nodes whereby the skeletal elements angle through and are substantially covered by the paste and support the same over substantially the entire thickness thereof without substantially interrupting continuity of the paste from one polygonal paste-retaining cell to the next.

2. A negative lead-acid storage battery plate of the Faure-type comprising:

a paste-supporting skeleton of lead material defining a flat, top current-collecting header of sheet lead having a thickness of about 0.04 inch and an upstanding connector lug, a reticulated portion depending from the header over substantially the entire length thereof and including a plurality of nodes from which skeletal elements project to define a plurality of rows of polygonal paste-retaining cells having minor axes extending substantially perpendicular to and major axes substantially parallel to said header, said nodes angling from one face of the reticulated portion to the other face thereof and having a polygonal cross-section in the transverse plane with two opposing sides of each polygon in planes substantially parallel to the faces of the pasted plate and spaced one from the other by a distance of about 0.055 inch, said skeletal elements angling from one side of each node to the opposite side of the adjacent node to which it connects and each having a transverse cross-sectional area of at least 0.0012 in.$^2$ nearer the header, and said cells each having a paste-retaining area of about 0.5 in.$^2$ with a minor to major axis ratio of about 0.7 throughout the major and lower part of the reticulated portion and significantly more nodes, skeletal elements and paste-retaining cells having much smaller paste-retaining areas in the reticulated portion contiguous to the header; and a fiber-laden active material paste embedding the reticulated portion of the skeleton and together therewith defining a substantially flat plate having faces substantially paralleling said opposing sides of said nodes and a thickness of about 0.065 inch whereby the skeletal elements and nodes zigzag through and are substantially covered by the paste so as to support the same over substantially the entire thickness thereof without substantially interrupting the continuity of the paste from one polygonal cell to the next.

* * * * *